United States Patent
Becker

(10) Patent No.: US 11,781,708 B1
(45) Date of Patent: Oct. 10, 2023

(54) LOW NON-REPETITIVE RUNOUT ROTATIONAL MOUNT

(71) Applicant: Bruker AXS, LLC, Billerica, MA (US)

(72) Inventor: Bruce Becker, Madison, WI (US)

(*) Notice: Subject to any disclaimer, the term of this patent is extended or adjusted under 35 U.S.C. 154(b) by 0 days.

(21) Appl. No.: 17/702,926

(22) Filed: Mar. 24, 2022

(51) Int. Cl.
*F16M 11/20* (2006.01)
*G01N 23/20025* (2018.01)
*F16M 11/24* (2006.01)

(52) U.S. Cl.
CPC ..... *F16M 11/2021* (2013.01); *F16M 11/2085* (2013.01); *F16M 11/2092* (2013.01); *F16M 11/24* (2013.01); *G01N 23/20025* (2013.01)

(58) Field of Classification Search
CPC ........... F16M 11/2021; F16M 11/2085; F16M 11/2092; F16M 11/24; G01N 23/20025
See application file for complete search history.

(56) References Cited

U.S. PATENT DOCUMENTS

| | | | | |
|---|---|---|---|---|
| 6,857,306 B2* | 2/2005 | Domeier | ................ | G01N 19/02 73/9 |
| 10,151,423 B2* | 12/2018 | Shelef | ................... | F16M 11/22 |
| 10,337,663 B2 | 7/2019 | Tang et al. | | |
| 2004/0042584 A1* | 3/2004 | Blank | .............. | G01N 23/20016 378/81 |
| 2017/0176319 A1* | 6/2017 | Dube | ................. | G01N 33/2888 |

FOREIGN PATENT DOCUMENTS

| | | | | |
|---|---|---|---|---|
| EP | 0500339 | | 8/1992 | |
| GB | 2596061 A | * | 12/2021 | ............. G01N 23/04 |
| GB | 2596061 A | | 12/2021 | |
| WO | 2002012833 A1 | | 2/2002 | |
| WO | 2012010836 | | 1/2012 | |
| WO | WO-2012010836 A2 | * | 1/2012 | ............ F16C 39/063 |

OTHER PUBLICATIONS

B Knapp et al article: Nanometer-level axis of rotation metrology for a high-precision macromolecular X-ray diffractometer2013 J. Phys.: Conf. Ser. 425 012012 (Year: 2013).*

(Continued)

*Primary Examiner* — Terrell L Mckinnon
*Assistant Examiner* — Ding Y Tan
(74) *Attorney, Agent, or Firm* — BENOIT & COTE, INC.

(57) ABSTRACT

A rotational device provides rotation of a location of interest about a rotational axis and includes first and second sockets each having three contact points distributed about the rotational axis. The contact points of each socket may be on convex surfaces and a spindle assembly is held between the sockets, which face each other along the rotational axis. The spindle assembly has a first convex surface centered about the rotational axis that contacts the contact points of the first socket, and a second convex surface that contacts the contact points of the second socket. The spindle assembly also has a drive shaft aligned with the rotational axis. Linear stages may be used to provide adjustment in one or more mutually perpendicular directions. An alternative embodiment uses a spindle assembly with two curved contact surfaces that contact respective curved surfaces that are adjacent to the rotational axis rather than aligned therewith.

20 Claims, 5 Drawing Sheets

(56) References Cited

OTHER PUBLICATIONS

Tuktarov et al. "Synthesis and Tribological Properties of Sulfur-Containing Methanofullerenes" Fullerenes, Nanotubes and Carbon Nanostructures, 22: 397-403, 2014, Taylor and Francis Group, LLC (Year: 2014).*
David Fellowes online tutorial tiled "Kinematic and Quasi-Kinematic Constraints: What They Are & How They Work" Dec. 11, 2006 (Year: 2006).*
Rob Campbell: "The Principle of Kinematic Constraint" online article dated Feb. 21, 2016 from Precision Machine Design (Year: 2016).*
"The Kinematic Encyclopedia" of Bal-tech https://www.precisionballs.com/KINEMATIC_ENCYCLOPEDIA.php (Year: 2017).*
Kinematics component catalog #105-B from Bal-tec dated May 6, 2021 by web.archive.org (Year: 2021).*
"Micro Inch Positioning with Kinematic Components" webpage at precisionballs.com from Bal-tec, dated Sep. 23, 2018 (Year: 2018).*
Furse et al "Kinematic design of fine mechanisms in instruments" Journal of Physics E Scientific Instruments v14, No. 1981 (Year: 1981).*
https://doi.org/10.1038/s41598-018-34478-5, TriboNet About Tribology, Four Ball Tester, Mar. 12, 2019.
Tuktarov, A.R., et al., "Synthesis and Tribological Properties of Sulfur-Containing Methanofullerenes", Fullerenes, Nanotubes, and Carbon Nanostructures, 22: 397-403, 2014.
Furse J. et al., "Kinematic design of fine mechanisms in instruments" Journal of Physics E. Scientific Instruments, IOP Publishing, v. 14, No. 3, 1981.

* cited by examiner

LOW NON-REPETITIVE RUNOUT ROTATIONAL MOUNT

BACKGROUND OF THE INVENTION

Field of the Invention

This invention relates generally to the field of precision rotatable components and, more specifically to, rotatable sample supports.

Description of the Related Art

In a number of different applications, there is a need to rotate a component very precisely about a predetermined axis while minimizing any displacement of the component in either a radial or an axial direction relative to the axis of rotation. In general, motors and other driving mechanisms are capable of providing rotation for mechanical operations, but do so within certain tolerances with regard to radial and axial displacements during the rotation. That is, the rotated component remains roughly centered about an axis of rotation, but a certain degree of radial or axial deviation during the rotation is considered acceptable, and generally has a negligible effect on the performance of the system in question. In high precision environments, however, such tolerances are considered unacceptable, as they would fundamentally impede the operation of the system.

An example of a system in which the rotation of a component must be accomplished with minimal deviation in the radial and axial directions is the examination of samples using X-ray or electron diffraction. In such systems, a sample mounted in a goniometer is irradiated with an energy beam at a series of different rotational angles, permitting a three-dimensional characterization of the sample via the resulting diffraction images. However, due to the extremely small size of the sample, maintaining the sample in the beam path is particularly challenging. If a common center point of the sample is not maintained for different rotation angles of the goniometer, or if the feature of interest on a sample does not lie at the center of all rotations, the sample feature will, upon rotation of the sample, precess through a finite volume known as the "sphere of confusion," which represents the minimum spherical range covering all possible locations of an infinitely small object at all possible rotation angles. Minimizing a sphere of confusion necessarily requires minimizing displacements of a sample due to the characteristics of the rotatable sample support, particularly displacements in a radial direction relative to the direction of an illuminating energy beam. As some diffractometry systems require very high precision in their sample rotation, it can be necessary to limit unintended displacements, which might move the sample area of interest out of the beam path, to a micron, or sub-micron, level. At such a degree of precision, minute variations in the dimensions of the rotational components, or the presence of dust or even lubricants, can detrimentally increase the sphere of confusion.

When evaluating such radial or axial displacements, recognition is given to whether the displacements are repetitive or non-repetitive. A repetitive displacement, also known as repetitive runout, is indicative of a permanent feature of the system that repeats with each revolution about the central axis. Such a feature is therefore predictable and can be compensated for using precision linear stages, which achieve displacements orders of magnitude more precisely than rotational devices. A non-repetitive displacement is a deviation that does not reoccur, and which therefore cannot be compensated for except with real-time corrections. Repetitive and non-repetitive displacements can occur in both a radial direction and an axial direction relative to the rotational axis. When operating a high-precision rotational system, minimizing any displacement is critical to system performance.

SUMMARY OF THE INVENTION

In accordance with the present invention, a rotational device is provided for allowing precise rotation of a location of interest about a rotational axis. In a first embodiment of the invention, the rotational device includes first and second sockets between which is located a spindle assembly. Each of the sockets has three contact points distributed about the rotational axis, the three contact points of the first socket facing a first axial direction relative to the rotational axis, while the three contact points of the second socket face a second axial direction relative to the rotational axis which is opposite the first axial direction. The first socket has a first axial position on the rotational axis, while the second socket has a second axial position on the rotational axis, with the location of interest lying between the first and second axial positions.

The spindle assembly has a first convex surface that is centered about the rotational axis and that contacts the three contact points of the first socket. The spindle assembly also has a second convex surface that is centered about the rotational axis and that contacts the three contact points of the second socket such that the spindle assembly is retained between the first and second sockets. A drive shaft of the spindle assembly is aligned with the rotational axis and extends away from the first and second convex surfaces of the spindle assembly to an axial position on the rotational axis that is to a side of the first socket away from the location of interest. Thus, the drive shaft of the spindle assembly may be rotated to rotate the spindle assembly relative to the first and second sockets.

The three contact points of the first and second sockets may be located on convex surfaces of those respective sockets, although it is also possible to use substantially flat surfaces with the sockets that provide the three contact points. In an exemplary version of this embodiment, the first socket comprises a plurality of first socket balls each of which provides one of three convex surfaces of the first socket, and the first socket balls are retained with a housing of the first socket, such as by a pressure fit. Similarly, the second socket may have a plurality of second socket balls each of which provides one of three convex surfaces of the second socket, and the second socket balls may be of a common size and material as the first socket balls. The material may be a hardened material, such as ceramic, that provides a relatively low degree of friction, wear and deflection. Typically, the materials in contact will have a hardness on the Mohs scale of less than 9.0 and Ra 0.02 (micrometer) or better surface finishes.

In the exemplary embodiment, the first and second convex surfaces of the spindle assembly may be formed by first and second spindle balls that are axially located to either side of the location of interest, which may include a sample support for a sample to be analyzed. The first and second sockets may be attached to a linear stage that is configured to allow adjustment of a position of the first and second sockets and the spindle assembly in a first adjustment direction. The linear stage may be one of a plurality of linear stages to which the first and second sockets are connected that allow adjustment of a position of the first and second sockets and the spindle assembly in a plurality of mutually perpendicular directions. A chassis for the rotational device may also be provided, and can include an elastic mechanism that is biased to urge the first and second sockets toward each other, and that permits slight changes in the relative axial positions of the first and second sockets while the spindle is rotated. Rotation of the spindle assembly may be provided by a motor that turns the drive shaft of the spindle assembly.

In an alternative embodiment of the invention, a spindle assembly is provided with two partially spheroidal contact surfaces, but the support structures that they contact are located to the side of the rotational axis rather than along it. A first support structure is located adjacent to a first axial position of the rotational axis and has at least two contact points that are distributed equally about a first radial direction perpendicular to the rotational axis. A second support structure has at least two contact points that are located adjacent to a second axial position on the rotational axis and that are distributed equally about a second radial direction perpendicular to the rotational axis. The contact points on the first and second support structures may be located on curved surfaces, which may take different forms. In one version of this embodiment, at least one of the first and second support structures may be a socket having three convex surfaces distributed equally about the first radial direction, and the socket may use three socket balls each of which provides one of the three convex surfaces. In another version of this embodiment, at least one of the first and second support structures may be two parallel rods each of which provides one of the two outwardly curved surfaces.

In this embodiment, the spindle assembly has first and second partially spheroidal surfaces that are each rotationally symmetric about the rotational axis. The first partially spheroidal surface contacts the contact points of the first support structure and the second partially spheroidal surface contacts the contact points of the second support structure. The spindle assembly has a drive mechanism by which the spindle assembly may be rotated.

A retention mechanism is also provided in this embodiment that maintains the first and second partially spheroidal surfaces of the spindle assembly in contact with the first and second support structures, respectively. The retention mechanism may include a rotational bearing through which the spindle assembly passes along the axial direction, and which may be spring-loaded to provide an elastic force urging the spindle assembly in a direction toward the first and second support structures. If the first partially spheroidal surface is in contact with a support structure having two contact points, such as a pair of parallel rods, movement of the first partially spheroidal surface is inhibited in a radial direction perpendicular to the rotational axis by action of the retention mechanism. If the first partially spheroidal surface is in contact with a support structure having three contact points, movement of the first partially spheroidal surface is inhibiting in both axial and radial directions by action of the retention mechanism.

As in other embodiments, the rotational device may include one or more linear stages to which the socket and the support structure are attached. The linear stage is configured to allow adjustment of a position of the first and second support structures and the spindle assembly in a first adjustment direction. Other linear stages may also be included that allow adjustment of the position of the first and second support structures and spindle assembly in other directions perpendicular to the first adjustment direction. A sample support for a sample to be analyzed in a diffractometer or other measurement instrument may be at the location of interest, and a motor may be used to rotate the spindle assembly.

The rotational device may also include a chassis to which the first and second support structures are mounted, the chassis including an elastic mechanism, such as a leaf spring, that flexes to accommodate slight changes in the relative axial positions of the first and second sockets as the spindle assembly is rotated. In one version of this embodiment, the first and second partially spheroidal surfaces each have a convex portion on a side facing away from the location of interest, and each of those convex portions resides in contact with a respective rigid flat surface during rotation of the spindle assembly so as to restrict axial motion of the spindle assembly. In this version, at least one of the rigid flat surfaces may have an elastic connection to the chassis that permits slight changes in the relative axial positions of the rigid flat surfaces as the spindle assembly is rotated.

DETAILED DESCRIPTION

Figure 1:
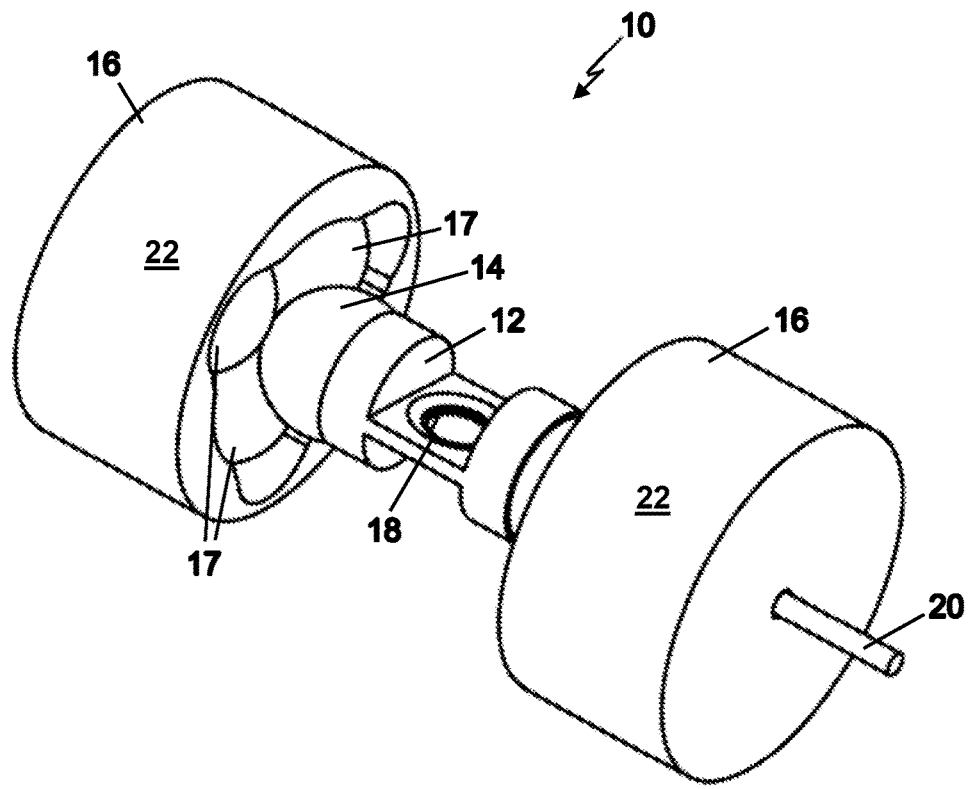
FIG. 1 is a perspective view of a rotational device according to the present invention.

Shown in FIG. 1 is a perspective view of a rotational device 10 according to the present invention. The device is intended for use at low rotation speeds, such as with a stop and start rotation of a sample mounted in an analysis system, and uses no rolling element bearings or sleeve bearings, which avoids what might otherwise be a significant source of non-repetitive runout. Instead, a spindle assembly 12 with a hardened ball 14 at each end is mounted between two trihedral sockets 16, each of which includes three precision machined contact balls 17 that establish, respectively, three points of contact between that socket 16 and the respective spindle ball 14 engaged thereby. A sample holder 18 is located in a central region of the spindle assembly 12 such that a sample on the sample holder will be rotated with rotation of the spindle assembly. During rotation, the trihedral sockets 16 remain stationary, while the spindle assembly rotation is controlled via drive shaft 20, which extends through a housing 22 of the proximal socket 16, and may be driven, for example, by a stepper motor or a piezoelectric motor.

Figure 2:
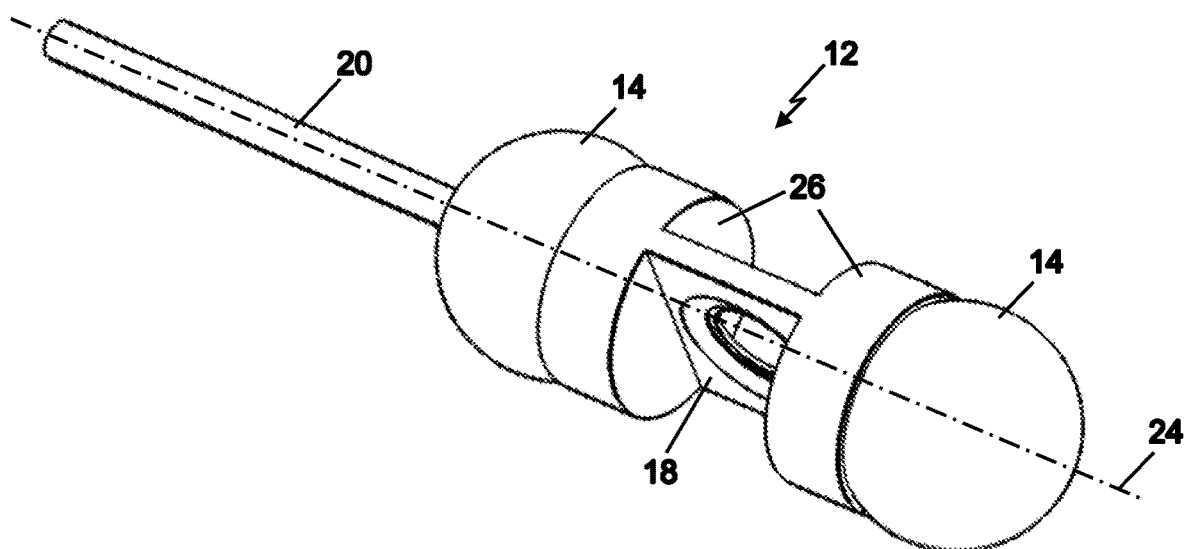
FIG. 2 is an isolated perspective view of a spindle assembly of the rotational device shown in FIG. 1, in a reverse orientation relative to FIG. 1.

An isolated view of the spindle assembly 12 is shown in FIG. 2 (in a reverse orientation relative to FIG. 1). The components of the spindle assembly are aligned along the axis of rotation 24, with a distal end of the drive shaft 20 being fixed to a center point of a proximal one of the two balls 14 of the spindle assembly. In the embodiment shown, each ball 14 is rigidly connected to a cylindrical flange 26 which is, in turn, rigidly connected to the sample support 18 between the flanges 26. The balls 14 and the flanges 26 are also aligned so as to ensure that the entire spindle assembly rotates uniformly about the axis 24 although, in the exemplary embodiment, the drive shaft 20 is flexible enough that minor misalignments will not be detrimental.

In this embodiment, each ball 14 is a perfect sphere, making it easier to manufacture and/or source. Because of the capacity for precision manufacturing of such balls, the contact between the balls 14 of the spindle assembly and the balls 17 of the sockets 16 is less likely to produce axial runout during rotation, and any such axial runout tends to be repetitive runout, which is relatively easy to compensate for using a linear stage (as discussed further below). An advantageous material for the ball is a ceramic, particularly silicon nitride, which is widely available in grades 3 and 5. Such materials demonstrate a particularly low friction and elastic modulus. Overall, materials used for the spindle assembly and any supporting structures should have low coefficients of thermal expansion so as to minimize temperature sensitivity. In addition to a silicon nitride ceramic, a possible material choice could be Invar®, although ceramic may be preferable if the invention is to be used with a system for which the presence of a metal would interfere with system operation. However, those skilled in the art will recognize that, as an alternative to the balls 14, surfaces that are only partially spheroidal (in the vicinity of the contact points with a respective socket) may be used, and that the balls 14 and their respective flanges may even be a single unitary component, provided that the device maintains three points of contact between the partially spheroidal surface and the corresponding socket.

Figure 3:
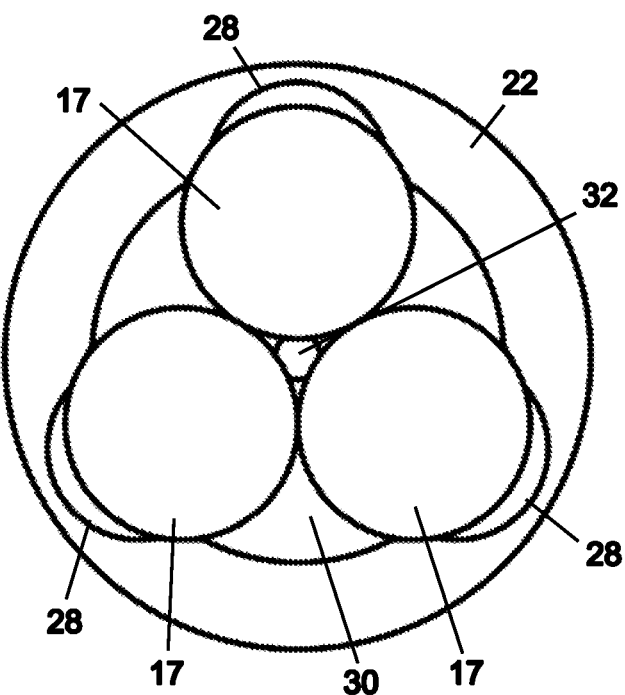
FIG. 3 is a front view of one of two trihedral sockets of the rotational device shown in FIG. 1.

A front view of one of the trihedral sockets along the axial direction is shown in FIG. 3. The socket housing 22 is generally annular, with three curved recesses 28 equally spaced along its inner surface. These recesses each receive one of the three contact balls 17 of that socket. An exterior surface 30 of the housing prevents axial movement of the contact balls 17 when pressure is applied by the spindle assembly, such that a firm contact is retained at the three contact points between the contact balls 17 and the adjacent spindle ball 14. In the present embodiment, a press fit of the balls in the housing prevents them from moving when the spindle is rotated.

Figure 4:
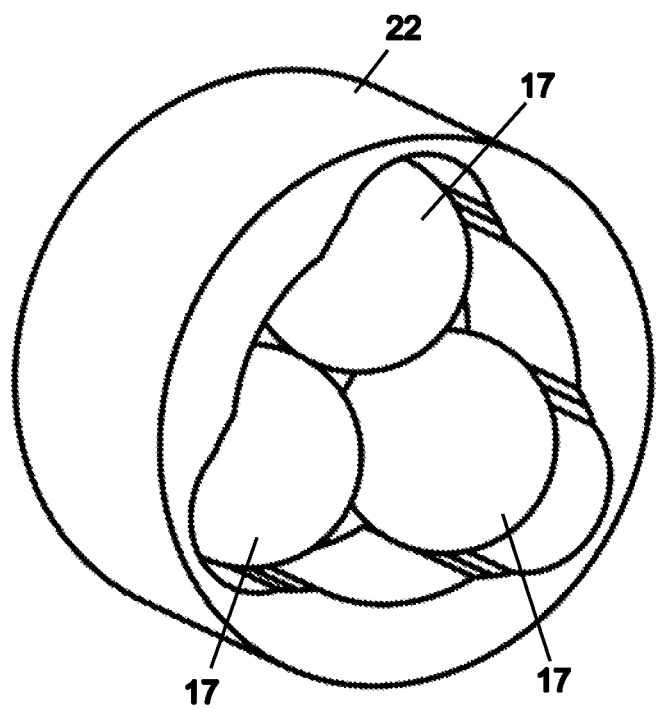
FIG. 4 is a perspective view of the trihedral socket shown in FIG. 3.

As shown in FIG. 3, the recesses 28 in the housing have a nominal inner radius of curvature that is slightly smaller than the radius of the contact balls and, when the balls 17 are pressed into the recesses 28, the socket housing flexes to enable the balls to be fully seated within the recesses. The elasticity of the socket housing 22 thereafter provides pressure on the exterior of the balls to prevent them from moving relative to the housing 22. In an alternative embodiment, the radius of the balls could be matched to the inner radius of the recesses 28 and, optionally in ether embodiment, an adhesive material could be used to secure the balls to the socket housing 22. Also shown in FIG. 3 is a central hole 32 in the exterior surface 30 that receives the drive shaft 20 of the spindle assembly 12, and that is aligned with the axis of rotation 24. A perspective view of one of the housings 22 is shown in FIG. 4, which indicates the relative thickness of the housing in the axial direction, which must be sufficient to accommodate the contact balls 17.

Figure 5:
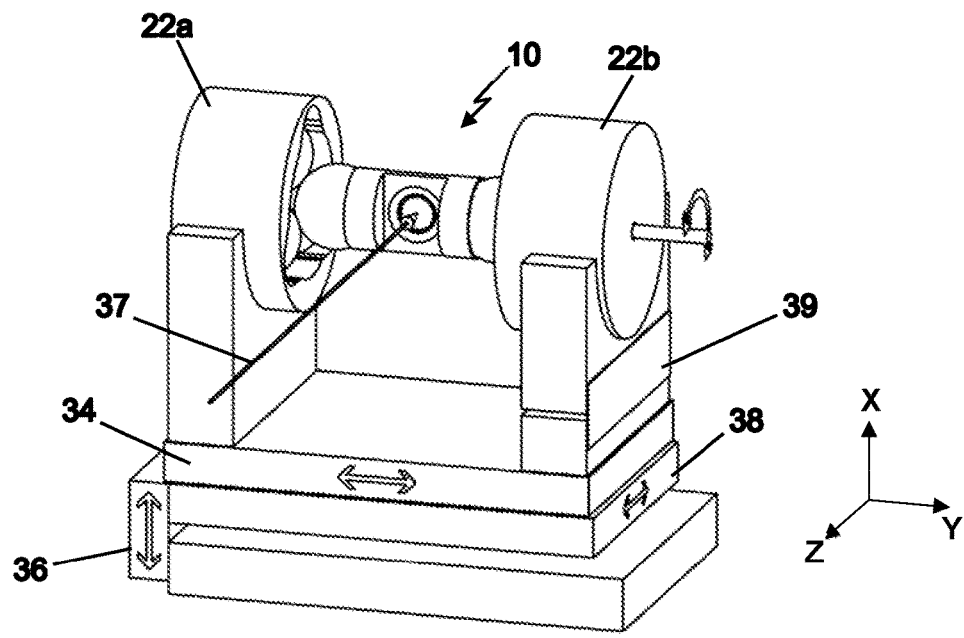
FIG. 5 is a perspective view of the rotational device of FIG. 1 mounted to a chassis having three linear stages.

FIG. 5 depicts the rotational device 10 mounted to a chassis 35 having three linear stages 34, 36, 38 that are movable, respectively, in three mutually perpendicular directions. In the embodiment shown in FIG. 5, linear stage 34 can be adjusted along the axis of rotation, defined here as the "y-direction," and linear stage 36 can be adjusted along an axis perpendicular to the y-direction, defined here as the "x-direction." The third linear stage 38 can displace the device in the "z-direction," which is perpendicular to the x- and y-directions and which, in this embodiment, is the direction of an illumination beam (represented by the arrow 37), such as an X-ray or electron beam for a diffractometer. In such embodiments the system is less sensitive to errors in the z-direction, particularly if the beam is collimated. For this reason, a different embodiment of the system may have only linear stages 34, 36 if compensation in the direction of the beam 37 is deemed unnecessary.

The linear stages 34, 36, 38 are useful to compensate for repetitive runout errors that may occur, despite the tight system tolerances, and can also be used for sample positioning. Repetitive runout errors are those displacements that occur with each revolution of the spindle, and are therefore predictable. Although the principal error of concern is radial runout, axial runout errors may also occur. Because of the predictability of repetitive runout errors, the linear stages 34, 36, 38 may be controlled using a software or hardware routine that adjusts the linear position in the x-, y- or z-direction by an equal and opposite amount to the expected error based on the degree of rotation of the spindle. It is also possible to use the linear stages 34, 36, 38 to compensate for non-repetitive runout errors but, as they are less predictable, the control of the stages must be responsive to a means of detecting deviations in the position of the sample holder. If used, for example, with a diffractometer, detected errors in the diffraction pattern caused by movement along the z-axis can be compensated for using linear stage 38. Depending on the application, for any of the three perpendicular directions, it is also possible to use both a coarse and a fine linear stage to enable more precise compensation of runout errors.

Also shown in FIG. 5 is the use of spring-loading of the system in the axial direction. In this embodiment, the two trihedral sockets 22a, 22b are identical and, when assembled, each socket is fixed to the chassis support beneath it. However, the support beneath the socket 22b consists of two portions that are interconnected by a leaf spring 39, which is biased in the axial direction toward an interior of the assembly so that the socket 22b exerts a force on the spindle in the direction of the socket 22a. The leaf spring 39 thereby provides pre-loading of the spindle/socket assembly, while remaining flexible enough to compensate for axial displacements, such as might be caused by thermal expansion/contraction or axial runout.

Although rotational systems frequently use lubricants to reduce friction, for systems requiring sub-micron precision, lubricants can contribute to non-repetitive runout errors. Thus, in the present embodiment, lubricants are preferably avoided. However, as low-rotation speed systems are less susceptible to heat build-up due to friction, and the present invention relies on precision point contacts between rotational components, as well as hardened balls as the contact surfaces, excessive friction and resulting heat build-up is avoided. The absence of a lubricant also permits the device to operate in a high vacuum environment. With the chosen materials, the device can be operated in a range of below zero Celsius to several hundred degrees Celsius. Runout correction tables or algorithms, used to compensate for runout errors in the system, can also include corrections of system errors caused by temperature changes.

In the embodiment shown, 12.7 mm diameter grade 5 silicon nitride balls were used together with a spindle assembly having an overall length of 3.8 cm, as measured from the outside of one of the balls to the outside of the other. The balls at either end of the spindle assembly were of the same size as the balls of the trihedral sockets, but the diameter of either the spindle balls or the socket balls could be changed to accommodate a particular application. The length of the spindle can also be adapted to the application in question although, in general, a longer spindle will reduce runout errors.

Figure 6:
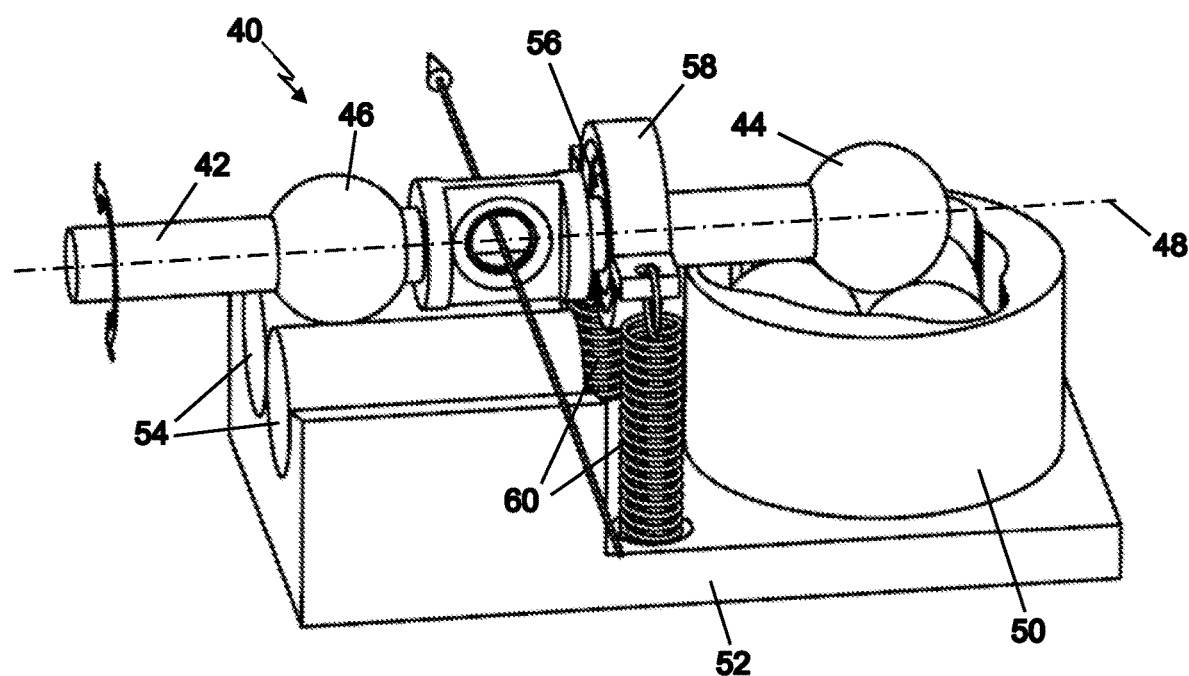
FIG. 6 is a perspective view of an alternative embodiment of the invention in which a spindle assembly having two partially-spheroidal surfaces is in spring-loaded contact with a trihedral socket and a pair of hardened support rods.

An alternative embodiment of the invention is shown in FIG. 6. In this embodiment, a rotational device 40 uses a spindle assembly 42 with two rounded portions 44, 46 that are centered about an axis of rotation 48. The rounded portions are partially spheroidal, and each makes contact with an underlying support structure. In particular, the rounded portion 44 rests atop a trihedral socket 50 which is, in turn, mounted atop a chassis 52. The trihedral socket 50 may have the same structure as the trihedral sockets shown in FIGS. 3 and 4, but it does not intersect the rotational axis 48. Rather, the three balls of the trihedral socket reside to one side of the rotational axis 48, and provide low-friction support to the spindle. The rounded portion 44 makes simultaneous contact with each of the balls of the trihedral socket 50, being cradled in a space formed therebetween. This positioning of the rounded portion 44 constrains the spindle assembly 42 in the axial direction while allowing low-friction rotation.

Since the axial position of the spindle assembly 42 is constrained by the contact between the rounded portion 44 and the trihedral socket 50, it is only necessary to restrain the rounded portion 46 in a radial direction. The present embodiment therefore uses a pair of parallel rods 54 that make simultaneous contact with the rounded portion 46. In this embodiment, the rods are cylindrical, but those skilled in the art will understand that the rods 54 need not be complete cylinders, provided that the surfaces that contact the rounded portion 46 are curved so that the contact between each rod 54 and the rounded portion 46 is limited to a single point. Although the socket 50 and the pair of rods 54 lie adjacent to the rotational axis 48, the contact points of each are equally distributed about a radial direction perpendicular to the rotational axis. The three contact points of the socket 50 are equally distributed about radial direction 51, and the two contact points of the pair of rods 54 are equally distributed about radial direction 53.

In order to maintain the contact between spindle assembly 42 and the trihedral socket 50 and cylindrical rods 54, a spring-loaded rotational bearing 56 is provided that inhibits radial movement of the spindle 42. A bracket 58 fits over the bearing 56 and is secured by two springs 60 that are connected to chassis 52. The springs 60 are under tension, and urge the bearing, and therefore the spindle assembly 42, toward the chassis 52, thus maintaining contact between the rounded portion 44 and the trihedral socket 50, and between the rounded portion 46 and the pair of rods 54. The bearing is provided with enough flexibility in the radial direction that it has little to no effect on the radial runout of the spindle assembly 42, which rests in firm contact with the trihedral socket 50 and the rods 54.

Figure 7:
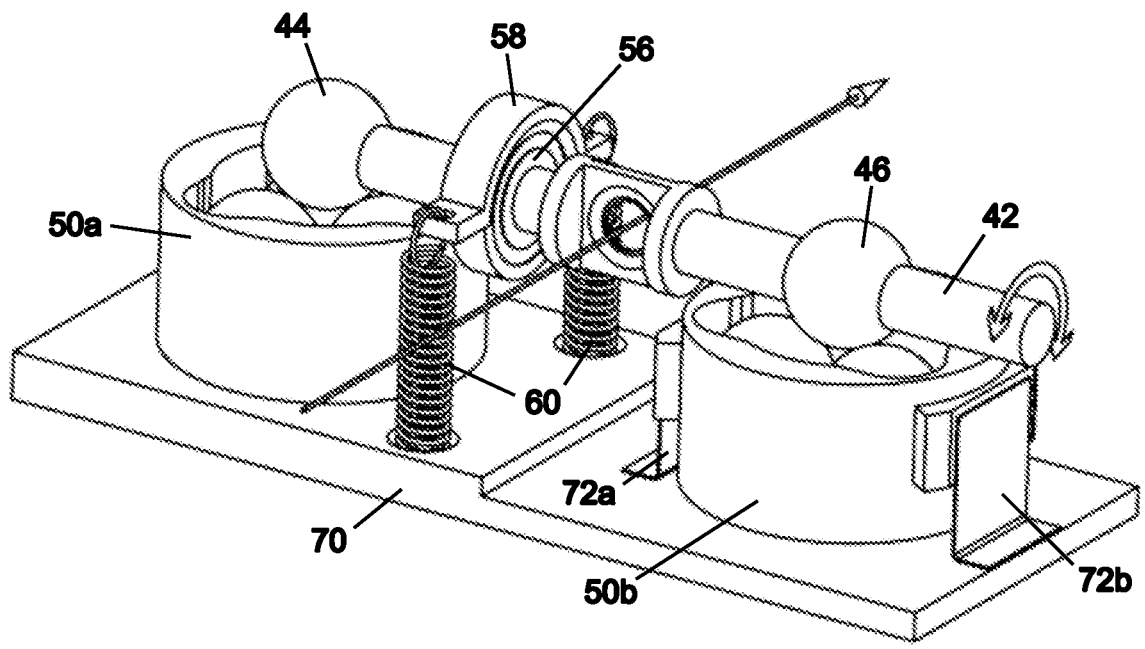
FIG. 7 is a perspective view of an alternative embodiment of the invention that uses a spindle assembly like that of FIG. 6, but for which each of the partially-spheroidal surfaces is in spring-loaded contact with a trihedral socket.

The embodiment shown in FIG. 7 uses a spindle assembly 42 that is essentially identical to the spindle assembly of FIG. 6, although it is shown in a different orientation relative to that of FIG. 6. Similarly, the bearing 56, bracket 58 and springs 60 are the same, but the chassis and supports of the device are different. In FIG. 7, the partially spherical portions 44, 46 of the spindle assembly 42 each rest atop a socket like the socket 50 of FIG. 6. Since each of these trihedral sockets restricts motion in the axial direction, the system also uses spring-loading in the axial direction to accommodate any minor axial fluctuations during rotation. The socket 50a is fixed to the chassis 70 of the device, but the socket 50b is not, being connected instead to two leaf springs 72a, 72b, each of which is independently secured to the chassis 70.

The leaf springs 72a, 72b of the FIG. 7 embodiment are fixed to opposite sides of the socket 50b at positions that maintain the socket elevated above the surface of the chassis 70. That is, the socket 50b is suspended by the springs 72a, 72b above the chassis 70, and is therefore free to move in the axial direction defined by the spindle assembly 42. The flexibility of the leaf springs 72a, 72b is selected relative to the tension of the springs 60 (which maintain the contact between the spindle assembly and the sockets) so that any relative axial displacements of the portions 44 and 46 of the spindle assembly during rotation will cause flexing of the leaf springs 72a, 72b before any disruption of the contact between the portions 44 and 46 of the spindle and their respective sockets 50a, 50b can occur. In this way, the suspension of the socket 50b by the leaf springs 72a, 72b permits any minor axial errors in the spindle assembly to be accommodated by the support arrangement without risking a radial displacement of one of the partially spherical portions that might otherwise occur.

Figure 8:
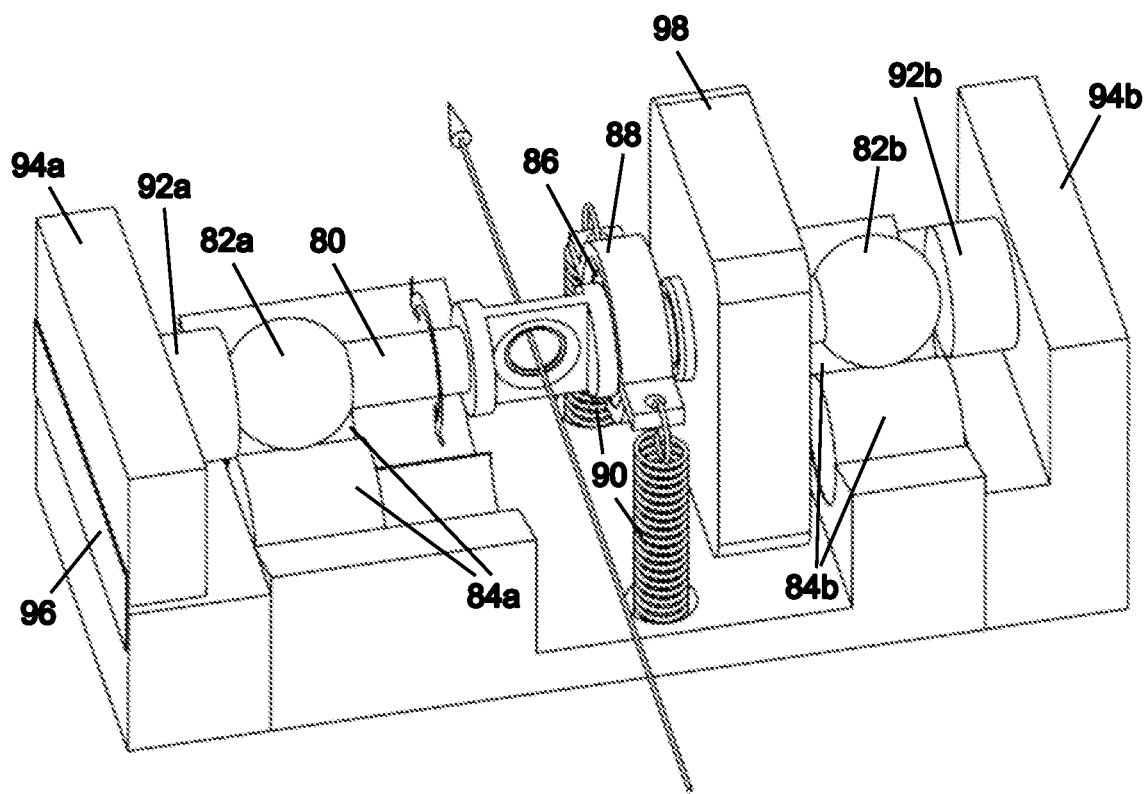
FIG. 8 is a perspective view of an alternative embodiment of the invention having a spindle with partially spheroidal terminations that each reside against a hardened surface and that are each supported by a pair of hardened support rods.

Another alternative embodiment of the invention is shown in FIG. 8. In this version of the invention, a spindle 80 has two partially spherical portions 82a and 82b and is supported by two pairs 84a, 84b of cylindrical rods similar to the cylindrical rods 54 of the FIG. 6 embodiment. In FIG. 8, however, it is both of the partially spherical portions 82a, 82b of the spindle 80 that are supported by cylindrical supports rather than just one of them. As in the embodiments of FIGS. 6 and 7, a spring-loaded rotational bearing 86 is provided that inhibits radial movement of the spindle 80. A bracket 88 fits over the bearing 86 and is secured by two springs 90 that are connected to the chassis of the device. The springs 90 are under tension, and urge the bearing, and therefore the spindle 80, toward the chassis, thus maintaining contact between the rounded portions 82a, 82b and the rod pairs 84a, 84b.

Since the rods of the rod pairs 84a, 84b are aligned parallel to the rotational axis they prevent radial movement of the spindle assembly, but provide no such restriction in the axial direction. Thus, the rounded portions 82a, 82b, which reside at the respective axial extremities of the spindle 80 assembly, are each contacted by a respective hardened stop 92a, 92b, that provides a hard, flat, low-friction surface against which a corresponding one of the rounded portions 82a, 82b of the spindle assembly is pressed. Because the contact surfaces of the hardened stops 92a, 92b are flat, there is a single point of contact between each of the rounded portions 82a, 82b and its respective stop 92a, 92b. The hardened stops thus constrain the spindle 80 in the axial direction as it is rotated.

In the FIG. 8 embodiment, hardened stop 92b is rigidly mounted to a side wall 94b of the chassis of the rotational device. On the opposite end, however, side wall 94a is not rigidly attached to the chassis but, rather, is connected thereto via a leaf spring 96. The leaf spring 96 is flexible in the axial direction such that any minor changes in the effective length of the spindle assembly 80 will be absorbed by flexing of the spring 96. Because the spindle assembly terminates at the rounded ends 82a, 82b, which press against the hardened stops 92a, 92b, there is no drive shaft that extends axially beyond the spindle 80 in this embodiment. As such, a drive motor 98 is located between the rounded ends 82a, 82b and is used to rotate the spindle as desired.

In each of the embodiments discussed above, the sockets or cylindrical rods that make contact with the spherical or partially spherical surfaces of the spindle assembly are outwardly curved such that contact is made between opposing curved surfaces. However, it is also possible for this contact to be between a curved surface and a flat surface, as that contact would also be at a single point, and therefore relatively low friction. For example, the trihedral sockets used in any of the above embodiments could be replaced with the socket 100 shown in FIG. 9, which would still provide contact at three contact points between the spindle and socket.

Figure 9:
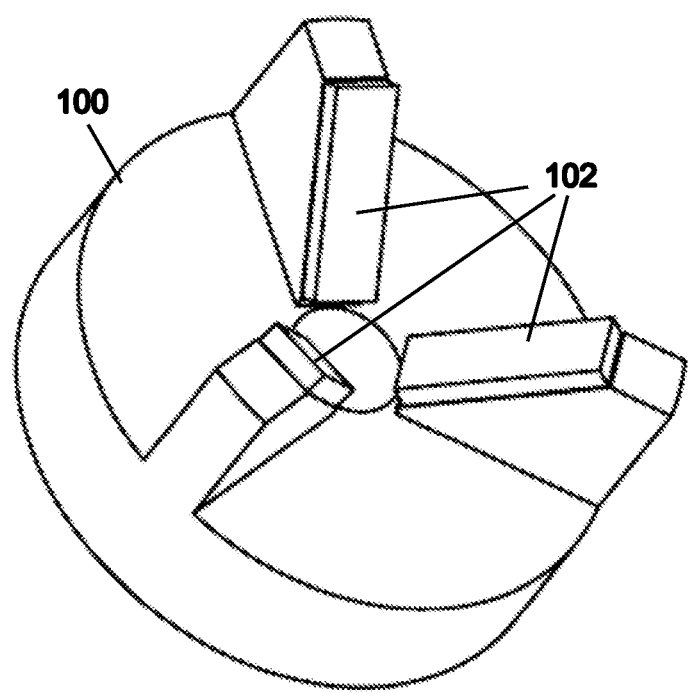
FIG. 9 is a perspective view of an alternative embodiment of a socket used with various embodiments of the invention, for which flat surfaces of the socket provide the contact points with a cooperating spindle.

While the sockets of the earlier embodiments use convex surfaces to contact the spindle at specific points, the socket 100 of FIG. 9 has flat surfaces that engage one of the curved surfaces of a spindle according to the invention. Although those flat surfaces could be an integral part of a larger socket component, or even part of a socket having a single, unitary construction, the socket of FIG. 9 uses inserts 102 that are rigidly secured to supporting portions of the socket. The use of such inserts simplifies the preparation of the surfaces of the inserts that make contact with the spindle curved surfaces, as these surfaces must be as flat and smooth as possible to minimize friction during rotation of the spindle. A hard, material, similar to those described above, could be used for the flat surfaces.

In the embodiment shown, the inserts 102 are arranged at relative angular positions of 120° about the circumference of the socket, although other relative positions of the surfaces may be used provided the surfaces restrain the radial movement of the spindle as it rotates. Similarly, the pitch of the surfaces is chosen to provide a sufficient restriction of such a radial movement by the spindle, although those skilled in the art will recognize that such design details may be selected in accordance with the specific application and the respective contact force between the spindle assembly and the surfaces. It is also possible to use more than three surfaces, although additional surfaces would typically add to the positional instability between the spindle assembly and socket. It is not necessary that the surfaces be completely flat, provided that they each have only a single point of contact with the spindle.

The invention claimed is:

1. A rotational device for precise rotation about a rotational axis of a location of interest having a predetermined axial position on the rotational axis, the rotational device comprising:
   a first socket having three contact points distributed about the rotational axis and facing a first axial direction relative to the rotational axis, the first socket having a first axial position on the rotational axis;
   a second socket having three contact points distributed about the rotational axis and facing a second axial direction relative to the rotational axis that is opposite to the first axial direction, the second socket having a second axial position on the rotational axis such that the location of interest lies between the first axial position and the second axial position; and
   a spindle assembly having a first convex surface that is centered about the rotational axis and that contacts the three contact points of the first socket and a second convex surface that is centered about the rotational axis and that contacts the three contact points of the second socket such that the spindle assembly is retained between the first and second sockets, the spindle assembly further having a drive shaft that extends away from the first and second convex surfaces of the spindle assembly via which the spindle assembly may be rotated.

2. A rotational device according to claim 1 wherein the three contact points of the first socket are located on three convex surfaces that contact the first convex surface of the spindle assembly.

3. A rotational device according to claim 1 wherein the three contact points of the first socket are located on three substantially flat regions that contact the first convex surface of the spindle assembly.

4. A rotational device according to claim 1 wherein at least one of the first socket and the second socket comprises three socket balls each of which provides one of the three contact points of the first socket.

5. A rotational device according to claim 4 wherein the three socket balls are retained within a housing of said at least one of the first socket and the second socket.

6. A rotational device according to claim 5 wherein the three socket balls are retained within a housing of said at least one of the first socket and the second socket by a pressure fit.

7. A rotational device according to claim 1 wherein the first and second convex surfaces of the spindle assembly are formed by first and second spindle balls that are axially located to either side of the location of interest.

8. A rotational device according to claim 1 wherein the location of interest comprises a sample support for a sample to be analyzed in a measurement instrument.

9. A rotational device according to claim 1 further comprising a linear stage to which the first and second sockets are attached, the linear stage being configured to allow adjustment of a position of the first and second sockets and the spindle assembly in an adjustment direction.

10. A rotational device according to claim 1 further comprising a chassis to which the first and second sockets are mounted, the chassis including an elastic mechanism that is biased to urge the first and second sockets toward each other, and that permits changes in the relative axial positions of the first and second sockets while the spindle assembly is rotated.

11. A rotational device for precise rotation about a rotational axis of a location of interest having a predetermined axial position on the rotational axis, the rotational device comprising:
   a first support structure located adjacent to a first axial position on the rotational axis and having at least two contact points distributed equally about a first radial direction perpendicular to the rotational axis;
   a second support structure located adjacent to a second axial position on the rotational axis and having at least two contact points distributed equally about a second radial direction perpendicular to the rotational axis, the location of interest being located between the first axial position and the second axial position;

a spindle assembly having a first partially spheroidal surface that is rotationally symmetric about the rotational axis and that contacts the contact points of the first support structure and a second partially spheroidal surface that is rotationally symmetric about the rotational axis and that contacts the contact points of the second support structure; and a retention mechanism that maintains the first and second partially spheroidal surfaces of the spindle assembly in contact with the first and second support structures, respectively.

12. A rotational device according to claim 11 wherein the first support structure comprises two surfaces that make contact with the first partially spheroidal surface of the spindle assembly at the two contact points of the first support structure, the two surfaces inhibiting movement of the first partially spheroidal surface of the spindle assembly in a radial direction perpendicular to the rotational axis by action of the retention mechanism.

13. A rotational device according to claim 11 wherein at least one of the first and second support structures comprises a socket having three convex surfaces distributed equally about the first radial direction each of which provides one of the contact points of that support structure.

14. A rotational device according to claim 13 wherein the socket comprises three socket balls each of which provides one of the three convex surfaces of the socket.

15. A rotational device according to claim 13 further comprising a chassis to which the first and second support structures are mounted, the chassis including an elastic mechanism that permits slight changes in the relative axial positions of the first and second sockets as the spindle assembly is rotated.

16. A rotational device according to claim 11 wherein at least one of the first and second support structures comprises two parallel rods that each provide one of the two contact points of that support structure.

17. A rotational device according to claim 11 wherein the retention mechanism comprises a rotational bearing through which the spindle assembly passes along the axial direction.

18. A rotational device according to claim 11 wherein the retention mechanism is spring-loaded and provides an elastic force urging the spindle assembly in a direction toward the first and second support structures.

19. A rotational device according to claim 11 wherein the first and second partially spheroidal surfaces of the spindle assembly each have a convex portion on a side facing away from the location of interest, and each of said convex portions resides in contact with a respective rigid flat surface of a hardened stop during rotation of the spindle assembly so as to restrict axial motion of the spindle assembly.

20. A rotational device according to claim 19 further comprising a chassis to which the first and second support structures and said rigid flat surfaces are mounted, wherein at least one of said rigid flat surfaces has an elastic connection to the chassis that permits slight changes in the relative axial positions of said rigid flat surfaces as the spindle assembly is rotated.

* * * * *